United States Patent
You et al.

(10) Patent No.: US 11,105,966 B2
(45) Date of Patent: Aug. 31, 2021

(54) FUNCTIONAL BUILDING MATERIAL FOR WINDOWS AND DOORS

(71) Applicant: LG HAUSYS, LTD., Seoul (KR)

(72) Inventors: Hyun-Woo You, Incheon (KR);
Youn-Ki Jun, Gwacheon-si (KR);
Dae-Hoon Kwon, Anyang-si (KR);
Sung-Jin Park, Incheon (KR);
Young-Woo Choi, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 79 days.

(21) Appl. No.: 16/330,234

(22) PCT Filed: Dec. 29, 2016

(86) PCT No.: PCT/KR2016/015482
§ 371 (c)(1),
(2) Date: Mar. 4, 2019

(87) PCT Pub. No.: WO2018/048034
PCT Pub. Date: Mar. 15, 2018

(65) Prior Publication Data
US 2019/0203529 A1    Jul. 4, 2019

(30) Foreign Application Priority Data

Sep. 6, 2016    (KR) .................. 10-2016-0114163

(51) Int. Cl.
*G02B 5/28* (2006.01)
*C03C 17/36* (2006.01)
(Continued)

(52) U.S. Cl.
CPC .............. *G02B 5/282* (2013.01); *C03C 17/36* (2013.01); *C03C 17/366* (2013.01);
(Continued)

(58) Field of Classification Search
CPC .. C03C 17/00–17/44; G02B 5/00–5/32; B32B 7/00–7/14; B32B 17/00–17/1099
See application file for complete search history.

(56) References Cited

U.S. PATENT DOCUMENTS

2003/0186064 A1    10/2003    Murata et al.
2009/0136765 A1*    5/2009    Maschwitz ......... C03C 17/3626
                                                                428/432
(Continued)

FOREIGN PATENT DOCUMENTS

AU        2012200149 A1    2/2012
JP        2010-500270 A    1/2010
(Continued)

OTHER PUBLICATIONS

International Search Report dated May 23, 2017, issued in corresponding International Patent Application No. PCT/KR2016/015482.

(Continued)

*Primary Examiner* — Prashant J Khatri
(74) *Attorney, Agent, or Firm* — Hauptman Ham, LLP

(57) ABSTRACT

A functional building material for a window includes a transparent glass substrate; and a low-emissivity coating formed on the transparent glass substrate. The low-emissivity coating includes a vertical sequential stack on the transparent glass substrate of a lowest barrier layer, a first dielectric layer, a lower barrier layer, a second dielectric layer, a first low-emissivity protective layer, a low-emissivity layer, a second low-emissivity protective layer, a third dielectric layer, an upper barrier layer, and a fourth dielectric layer in this order. The lowest barrier layer includes one selected from a group consisting of a first metal, a first complex metal, a first metal oxide, a first complex metal (Continued)

oxide, a first metal oxynitride, a first complex metal oxynitride, and a combination thereof.

6 Claims, 4 Drawing Sheets

(51) Int. Cl.
    *E06B 9/24*           (2006.01)
    *E06B 3/66*           (2006.01)

(52) U.S. Cl.
    CPC ...... *C03C 17/3626* (2013.01); *C03C 17/3644* (2013.01); *C03C 17/3649* (2013.01); *E06B 3/66* (2013.01); *E06B 9/24* (2013.01); *E06B 2009/2464* (2013.01); *Y10T 428/31504* (2015.04)

(56) References Cited

U.S. PATENT DOCUMENTS

| | | |
|---|---|---|
| 2011/0262726 A1 | 10/2011 | Knoll et al. |
| 2011/0300319 A1* | 12/2011 | Reymond ............... C03C 17/36 428/34 |
| 2012/0171443 A1 | 7/2012 | Jun et al. |
| 2012/0225224 A1 | 9/2012 | Blacker et al. |
| 2012/0225317 A1 | 9/2012 | Imran et al. |
| 2015/0146286 A1* | 5/2015 | Hagen ................. C03C 17/3435 359/359 |
| 2015/0247961 A1* | 9/2015 | Jribi ....................... C03C 17/36 359/360 |
| 2015/0307391 A1 | 10/2015 | Blacker et al. |
| 2016/0002098 A1* | 1/2016 | Sternchuss .......... B32B 17/1077 428/216 |

FOREIGN PATENT DOCUMENTS

| | | |
|---|---|---|
| JP | 2016-041651 A | 3/2016 |
| JP | 2016-160142 A | 9/2016 |
| KR | 10-0763731 B1 | 10/2007 |
| KR | 10-2011-0033769 A | 3/2011 |
| KR | 10-2016-0010332 A | 1/2016 |
| WO | 03-042122 A2 | 5/2003 |
| WO | 2011-037365 A2 | 3/2011 |

OTHER PUBLICATIONS

Extended European Search Report dated Sep. 19, 2019 in connection with the counterpart European Patent Application No. EP16915828.4.

Japanese Office Action dated Jan. 29, 2021, in connection with the Japanese Patent Application No. 2019-512631.

* cited by examiner

FUNCTIONAL BUILDING MATERIAL FOR WINDOWS AND DOORS

CROSS REFERENCE TO RELATED APPLICATION

This present application is a national stage filing under 35 U.S.C § 371 of PCT application number PCT/KR2016/015482 filed on Dec. 29, 2016 which is based upon and claims the benefit of priority to Korean Patent Application No. 10-2016-0114163 filed on Sep. 6, 2016 in the Korean Intellectual Property Office. The disclosures of the above-listed applications are hereby incorporated by reference in their entireties.

TECHNICAL FIELD

The present disclosure relates to a functional building material for a window.

BACKGROUND

A low-emissivity glass refers to a glass on which a low-emissivity layer containing a metal with a high reflectance in an infrared region such as silver (Ag) is deposited as a thin film. This low-emissivity glass is a functional material to reflect radiation in the infrared region, thereby blocking outdoor solar radiation in summer and to save energy of a building by preserving indoor radiant heat in winter.

In general, the silver (Ag) used for the low-emissivity layer is oxidized when exposed to air. Thus, a dielectric layer as an oxidation-preventive layer is deposited on each of top and bottom faces of the low-emissivity layer. This dielectric layer also serves to increase a visible light transmittance.

DISCLOSURE

Technical Purpose

One implementation of the present disclosure provides a functional building material for a window with improved heat resistance, moisture resistance and abrasion resistance while maintaining an excellent optical performance.

Technical Solution

In one implementation of the present disclosure, there is provided a functional building material for a window, the functional building material comprising: a transparent glass substrate; and a low-emissivity coating formed on the transparent glass substrate, wherein the low-emissivity coating includes a vertical sequential stack on the transparent glass substrate of a lowest barrier layer, a first dielectric layer, a lower barrier layer, a second dielectric layer, a first low-emissivity protective layer, a low-emissivity layer, a second low-emissivity protective layer, a third dielectric layer, an upper barrier layer, and a fourth dielectric layer in this order, wherein the lowest barrier layer includes one selected from a group consisting of a first metal, a first complex metal, a first metal oxide, a first complex metal oxide, a first metal oxynitride, a first complex metal oxynitride, and combination thereof, wherein each of the lower barrier layer and the upper barrier layer includes one selected from a group consisting of a second metal, a second complex metal, a second metal nitride, a second complex metal nitride, and combinations thereof, wherein each of the lowest barrier layer, the lower barrier layer and the upper barrier layer is single-layered or multi-layered.

The first metal may be Si, Zr or Ti, and the first complex metal may be SiAl, ZrSi, or TiZr.

The second metal may be Si, Zr, Ti, Nb, Ni or Cr, and the second complex metal may be SiAl, ZrSi, TiZr, NiCr, NiTi, NbZr or NiTiNb.

Technical Effect

The functional building material for a window in accordance with the present disclosure is excellent in a heat resistance, a moisture resistance and an abrasion resistance.

DETAILED DESCRIPTIONS

Figure 1:
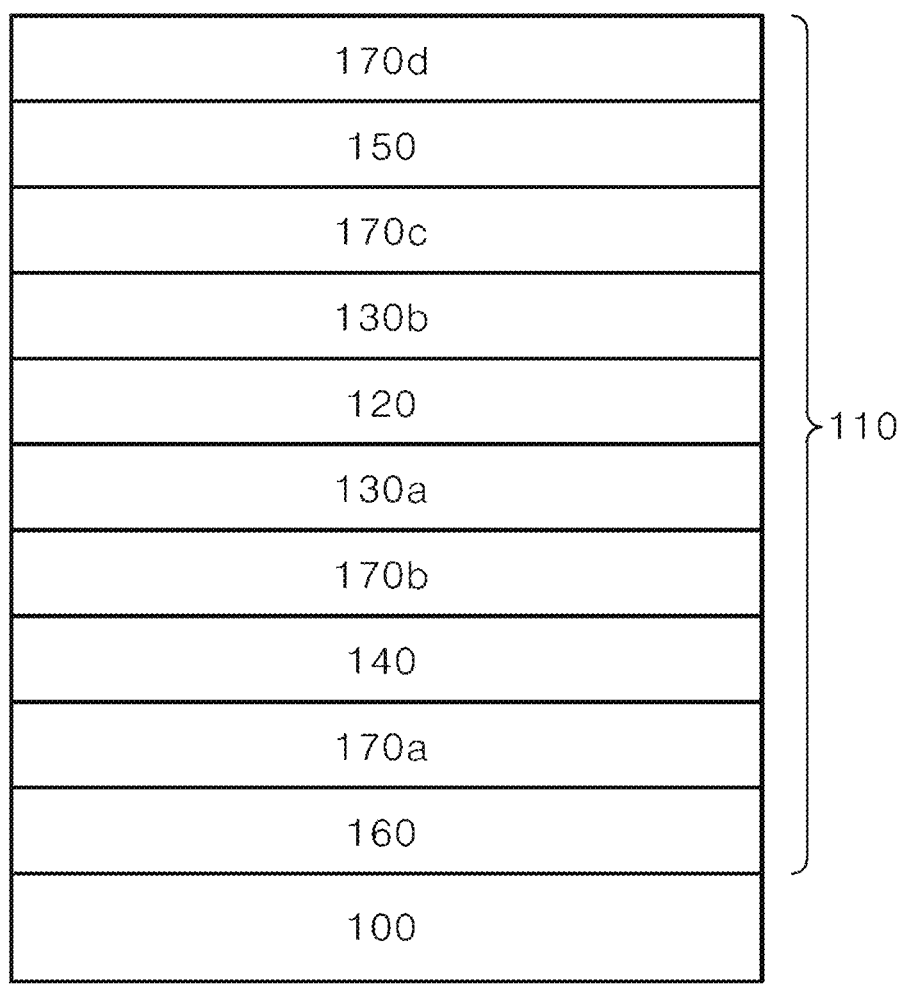
FIG. 1 is a schematic cross-sectional view of a functional building material for a window according to one implementation of the present disclosure.

Hereinafter, with reference to the accompanying drawings, embodiments of the present disclosure will be described in detail so that a person skilled in the art can readily carry out the present disclosure. The present disclosure may be implemented in a number of different forms and may not be limited to embodiments as described herein.

In order to clearly illustrate the present disclosure, descriptions of well-known portions will be omitted, and the same or similar components are denoted by the same reference numerals throughout the specification.

In the drawings, a thickness is enlarged to clearly indicate a layer and a region. In the drawings, for convenience of illustration, thicknesses of some layers and regions are exaggerated.

Hereinafter, formation of a first structure above (or below) or on (or beneath) a second structure means that the first structure is formed in direct contact with a top face (or a bottom face) the second structure or means that a third structure is intervened between the first and second structures.

In one implementation of the present disclosure, there is provided a functional glass building material 10 for a window including a transparent glass substrate 100 and a low-emissivity coating 110 coated on the transparent glass substrate 100.

The low-emissivity coating 110 may include a vertical stack of a lowest barrier layer 160, a first dielectric layer 170a, a lower barrier layer 140, a second dielectric layer 170b, a first low-emissivity protective layer 130a, a low-emissivity layer 120, a second low-emissivity protective layer 130b, a third dielectric layer 170c, an upper barrier layer 150 and a fourth dielectric layer 170d in this order on the transparent glass substrate 100.

The lowest barrier layer 160 includes one selected from a group consisting a first metal, a first complex metal, a first metal oxide, a first complex metal oxide, a first metal oxynitride, a first complex metal oxynitride, and combinations thereof.

Each of the lower barrier layer 140 and the upper barrier layer 150 includes one selected from a group consisting of a second metal, a second complex metal, a second metal nitride, a second complex metal nitride, and combinations thereof.

Each of the lowest barrier layer 160, the lower barrier layer 140, and the upper barrier layer 150 may be embodied as a single layer or a stack of multiple layers.

FIG. 1 is a cross-sectional view of a functional building material 10 for a window according to another implementation of the present disclosure.

The low-emissivity coating 110 is embodied as a multi-layer thin film structure including the low-emissivity layer 120 that selectively reflects far-infrared rays among solar radiation rays. This coating 110 may be formed as in FIG. 1. This low-emissivity layer 120 may lower an emissivity and allow the low-emissivity coating 110 to have an excellent thermal insulating performance due to its low-emissivity (i.e., low-e: low emissivity effect).

The low-emissivity coating 110 may be formed to have the above configuration. For example, when the coating 110 is applied as a coated film on a window glass, the coating 110 reflects outdoor solar radiations in summer, and saves energy of a buildings by minimizing heat transfer between indoor and outdoor and preserving indoor radiant heat in winter. Thus, the coating 110 may act as a functional material.

As used herein, a term "emissivity" refers to a ratio of energy which an object absorbs, transmits and reflects to input energy at a certain wavelength. That is, as used herein, the emissivity represents a ratio of absorbed infrared energy to input infrared energy in an infrared wavelength region. Specifically, the term "emissivity" refers to a ratio of infrared energy absorbed by the object to a total applied infrared energy when a far-infrared ray corresponding to a wavelength range of about 5 μm to about 50 μm having a strong thermal action is applied.

According to Kirchhoff's law, the infrared energy absorbed by an object is equal to the infrared energy emitted by the object again. Thus, the absorbance and emissivity of the object have the same value.

Further, because the infrared energy that is not absorbed by the object is reflected from an surface of the object, the higher the reflectance of the infrared energy from the object, the lower the emissivity of the object. Numerically, this may be expressed as a relationship of infrared ray emissivity=1−infrared ray reflectance.

The emissivity may be measured using various methods commonly known in the art. For example, the emissivity may be measured by a facility such as a Fourier transform infrared spectroscope (FT-IR) according to a KSL2514 standard.

For an arbitrary object, for example, the low-emissivity glass, the absorbance, that is, the emissivity, of the far infrared rays exhibiting such a strong thermal action may be very important factor in measuring the heat insulating performance thereof.

When the low-emissivity coating 110 is applied as a coating film onto the transparent glass substrate 100, the coating 110 maintains a predetermined transmission characteristic in a visible light region to realize good natural lighting performance and further provides an excellent thermal insulation effect by lowering the emissivity in the infrared region. Thus, the low-emissivity coating 110 may act as a functional building material for an energy-saving window. A glass having this functional building material may be called 'Low-e glass'.

The low-emissivity layer 120 may be embodied as a layer of electrically conductive material, such as a metal, which may have a low emissivity. That is, the layer 120 has a low sheet resistance and therefore a low emissivity. For example, the low-emissivity layer 120 may have an emissivity of about 0.01 to about 0.3, specifically about 0.01 to about 0.2, more specifically about 0.01 to about 0.1, and still more specifically about 0.01 to about 0.08.

The low-emissivity layer 120 having the above defined emissivity range may simultaneously achieve excellent natural-lighting performance and thermal insulation effect by properly adjusting visible light transmittance and infrared ray emissivity. The low-emissivity layer 120 having the above defined emissivity range may have a sheet resistance of, for example, from about 0.78 Ω/sq to about 6.42 Ω/sq. The present disclosure is not limited thereto.

The low-emissivity layer 120 selectively transmits and reflects solar radiations, and has a low-emissivity due to its high reflectivity of the solar radiation in the infrared region. The low-emissivity layer 120 may include, but is not limited to, at least one selected from a group consisting of Ag, Au, Cu, Al, Pt, ion-doped metal oxide, and combinations thereof. A material of the low-emissivity layer 120 may include any of metals known to be capable of achieving low-emissivity performance. The ion doped metal oxide may include, for example, indium tin oxide (ITO), fluorine doped tin oxide (FTO), Al doped zinc oxide (AZO), gallium zinc oxide (GZO), and the like. In one implementation, the low-emissivity layer 120 may be embodied as a layer made of silver (Ag). As a result, the low-emissivity coating 110 can achieve a high electrical conductivity, a low absorption in a visible light range, and durability.

A thickness of the low-emissivity layer 120 may be, for example, in a range of from about 5 nm to about 25 nm. The low-emissivity layer 120 with the thickness in the above range may be suitable for simultaneously achieving the low infrared emissivity and the high visible light transmittance.

Each of the low-emissivity protective layers 130a and 130b may be made of a metal having excellent light absorption performance. A color rendered from the low-emissivity coating 110 may be controlled by adjusting a material, thickness, and the like of each of the low-emissivity protective layers 130a and 130b.

In one implementation, each of the low-emissivity protective layer 130a and 130b may have an extinction coefficient of about 1.5 to about 3.5 in the visible light region. The extinction coefficient is a value derived from an optical constant, which is a characteristic inherent to a material. The optical constant may be expressed as n-ik. In this connection, a rear part n refers to a refractive index, and an imaginary part k refers to the extinction coefficient (referred to as absorption coefficient). The extinction coefficient is a function of a wavelength λ. For a metal, the extinction coefficient is generally greater than zero. The extinction coefficient k has a following relationship with an absorption coefficient α: α=(4πk)/λ. The absorption coefficient α has a following relationship with d as a thickness of a medium through which a light beam passes, I0 as an intensity of an output light beam from the medium and an intensity I of an input light beam to the medium: I=I0exp(−αd). Thus, due to the absorption of the light beam by the medium, the intensity of the output beam is lower than the intensity of the input beam.

The low-emissivity protective layer 130a and 130b may be made of a metal having the extinction coefficient in the above range in the visible light region to absorb a certain proportion of the visible light to allow the low-emissivity coating 110 to render a predetermined color.

For example, each of the low-emissivity protective layers 130a and 130b may include at least one selected from a group consisting of Ni, Cr, Ni and Cr alloys, and combinations thereof. However, the present is not limited thereto.

Each of the low-emissivity protective layers 130a and 130b may be embodied as a single layer or a stack of a plurality of layers. The low-emissivity protective layer may be disposed on top and/or bottom faces of the low-emissivity layer 120. As shown in FIG. 1, the low-emissivity protective layers 130a and 130b may sandwich the low-emissivity layer 120 therebetween.

A thickness of each of the low-emissivity protective layers 130a and 130b may be, for example, in a range of from about 0.5 nm to about 5 nm. The present disclosure is not limited thereto. The thickness may vary suitably according to a purpose of the window. When the low-emissivity coating 110 has the low-emissivity protective layers 130a and 130b in the above thickness range, the coating 110 may adjust a transmittance and a reflectance thereof to a predetermined transmittance and a predetermined reflectance respectively while performing a function executed by the low-emissivity protective layers 130a and 130b.

The metal that constitutes the low-emissivity layer 120 is generally oxidized. Thus, the first dielectric layer 170a, the second dielectric layer 170b, the third dielectric layer 170c, and the fourth dielectric layer 170d (hereinafter, collectively referred to as a dielectric layer 170a, 170b, 170c and 170d) may serve to prevent the oxidation of the low-emissivity layer 120. Further, the dielectric layer 170a, 170b, 170c and 170d serves to increase visible light transmittance. Further, an optical performance of the low-emissivity coating 110 may be controlled by appropriately adjusting a material and physical properties of the dielectric layer 170a, 170b, 170c and 170d.

The dielectric layer 170a, 170b, 170c and 170d may be formed of a single layer or a plurality of layers depending on physical properties to be implemented, which is based on an intended purpose of the window. In FIG. 1, the dielectric layer 170a, 170b, 170c and 170d includes four layers.

Specifically, both lower dielectric layers sandwiches the lower barrier layer 140 therebetween while both upper dielectric layers sandwiches the upper barrier layer 150 therebetween.

The dielectric layer 170a, 170b, 170c, and 170d may include various metal oxides, metal nitrides, and the like. Known materials used for protecting the low-emissivity layer 120 may be used without limitation.

Specifically, the dielectric layer 170a, 170b, 170c and 170d may include at least one selected from a group consisting of a third metal oxide, a third metal nitride, a third metal oxynitride, and combinations thereof. The at least one selected from the group consisting of the third metal oxide, the third metal nitride, the third metal oxynitride, and combinations thereof may be doped with at least one selected from a group consisting of bismuth (Bi), boron (B), aluminum (Al), silicon (Si), magnesium (Mg), antimony (Sb), beryllium (Be), and combinations thereof.

The third metal may include, without limitation, a metal or complex metal known to allow the dielectric layer 170a, 170b, 170c and 170d to protect the low-emissivity layer 120. For example, the dielectric layer 170a, 170b, 170c and 170d may include at least one selected from a group consisting of titanium oxide, zinc tin oxide, zinc oxide, zinc aluminum oxide, tin oxide, bismuth oxide, silicon nitride, silicon aluminum nitride, silicon tin nitride and combinations thereof. The disclosure is not limited thereto. The selected at least one may be doped with at least one selected from a group consisting of bismuth (Bi), boron (B), aluminum (Al), silicon (Si), magnesium (Mg), antimony (Sb), beryllium (Be), and combinations thereof. This may contribute to improving durability.

The dielectric layer 170a, 170b, 170c and 170d may be made of a dielectric material having a refractive index between about 1.5 and about 2.3. A thickness of the dielectric layer 170a, 170b, 170c and 170d may be adjusted to achieve desired levels of a transmittance and a reflectivity, and a transmitted color and a reflected color, etc., based on the value of the refraction index.

A thickness of each of the dielectric layers 170a, 170b, 170c and 170d may be, for example, in a range of from about 5 nm to about 60 nm. The thicknesses of each of the dielectric layers 170a, 170b, 170c and 170d may be variously adjusted based on a position and a material thereof in order to adjust an optical performance (transmittance, reflectance and color index) of an entire multilayer-based thin film to a target performance. The optical performance may be controlled by adjusting the thickness of each of the dielectric layers 170a, 170b, 170c and 170d within the above range. This thickness may be controlled to achieve a proper production speed.

The dielectric layer 170a, 170b, 170c and 170d may be made of a material having a light extinction coefficient which is substantially zero or very close to zero. When the extinction coefficient is greater than 0, this means that the incident light is absorbed into the dielectric layer 170a, 170b, 170c and 170d before reaching the low-emissivity layer 120. This is undesirable because this may disallow securing a transparent visual field. Thus, in one example, the extinction coefficient of the dielectric layer 170a, 170b, 170c and 170d may be lower than about 0.1 in the visible light region (that is, in a wavelength range of about 380 nm to about 780 nm). As a result, the dielectric layer 170a, 170b, 170c and 170d may allow excellent natural-lighting performance, thereby helping to ensure a clear view.

The low-emissivity coating 110 includes multiple barrier layers including the upper barrier layer 150, the lower barrier layer 140, and the lowest barrier layer 160. As shown in FIG. 1, the formation of the upper barrier layer 150, the lower barrier layer 140, and the lowest barrier layer 160 at respective specific positions may disallow oxygen and moisture diffusion. Further, the functional building material 10 for the window using the multiple barrier layers improves the heat resistance, the moisture resistance and the abrasion resistance without deteriorating the optical performance.

A heat treatment process for applying a preliminary stress using a bending or tempering process may be performed in a process of forming the low-emissivity coating 110 on one face of the transparent glass substrate 100 to manufacture a functional building material 10 for a window. The heat treatment process may be performed via heating to a temperature of about 600 to 700 degrees C. During the application of the heat, the materials constituting the low-emissivity coating 110 may be often subjected to oxidation, diffusion, or agglomeration such that the layers are subjected to structural modifications. Further, when the low-emissivity coating 110 is exposed to the hot temperature and high humidity environment, the low-emissivity layer 120 contacts substances acting as a corrosive agent such as oxygen, chloride, sulfide, and sulfur dioxide. Thus, there occurs a problem that the glass coating film is damaged due to the corrosion of the low-emissivity coating 110. Further, the functional building material 10 for the window may have a problem that the low-emissivity coating 110 is often damaged due to scratches during transportation or handling.

Thus, the low-emissivity coating 110 is required to be protected from the heat treatment processes, from the hot and humid ambient environments, or from the physical damage during handling or transportation.

To this end, the functional building material 10 for the window is formed as the structure having the multiple barrier layers as described above. Thus, the chemical or physical diffusion of alkali ions and oxygen may be suppressed by the lowest barrier layer 160, the lower barrier layer 140 and the upper barrier layer 150. Accordingly, the barrier layers may function to protect the low-emissivity coating 110 from the above-described heat treatment process and high temperature and high humidity environment. Further, the lowest barrier layer 160 improves an interfacial adhesion between the glass substrate 100 and the low-emissivity coating 110 to improve the abrasion resistance of the low-emissivity coating 110.

Accordingly, the functional building material 10 for the window containing the multi-layer barrier layer is excellent in heat resistance, moisture resistance and abrasion resistance.

The lowest barrier layer 160 may include one selected from a group consisting of the first metal, first complex metal, first metal oxide, first complex metal oxide, first metal oxynitride, first complex metal oxynitride, and combinations thereof.

The first metal may be Si, Zr or Ti. The first complex metal may be SiAl, ZrSi, or TiZr. SiAl means an alloy of Si and Al. As used herein, alloys may be labeled in the same manner unless otherwise specified.

In one implementation, the lowest barrier layer may include one selected from a group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and combinations thereof.

Each of the lower barrier layer and the upper barrier layer may include one selected from a group consisting of a second metal, a second complex metal, a second metal nitride, a second complex metal nitride, and combinations thereof.

The second metal may be Si, Zr, Ti, Nb, Ni or Cr. The second complex metal may be SiAl, ZrSi, TiZr, NiCr, NiTi, NbZr or NiTiNb.

In another implementation, each of the lower barrier layer and the upper barrier layer may include one selected from a group consisting of zirconium nitride, zirconium silicon nitride, titanium nitride, titanium zirconium nitride, niobium nitride, nickel nitride, chromium nitride, nickel chromium nitride, nickel titanium nitride, niobium zirconium nitride, nickel titanium niobium nitride, and combinations thereof.

The low-emissivity coating 110 may further include additional layers other than the above-described structures in order to realize a predetermined optical performance The transparent glass substrate 100 may be embodied as a transparent substrate having a high visible light transmittance. For example, the substrate 100 may be embodied as a glass or transparent plastic substrate having a visible light transmittance of about 80% to about 100%. In one example, the transparent glass substrate 100 may be embodied, without limitation, as any glass used for a construction purpose. For example, a thickness of the substrate 100 may be in a range of from about 2 mm to about 12 mm. The thickness may vary depending on the purpose and function of the window. The present disclosure is not limited thereto.

In order to manufacture the functional building material for the window, first, the transparent glass substrate 100 may be prepared, and then layers constituting the low-emissivity coating 110 may be sequentially formed on the substrate 100. Each of the layers constituting the low-emissivity coating 110 may be formed using a known method or using a method suitable for realizing a desired physical property.

For example, each of the low-emissivity layer 120, the low-emissivity protective layers 130a and 130b, the lower barrier layer 140, the upper barrier layer 150 and the lowest barrier layer 160 may be formed using a sputtering method or the like.

The Present and the Comparative Examples in the present disclosure are described below. The Present Examples below are only an example of the present disclosure. Thus, the present disclosure is not limited to the Present Examples below.

PRESENT EXAMPLE

Present Example 1

Using a magnetron sputtering evaporator (Selcos Cetus-S), a multi-layered low-emissivity coating coated on a transparent glass substrate was prepared as follows.

A lowest barrier layer was formed on a 6 mm thick transparent glass substrate by depositing a 10 nm thick $SiAlO_x$ metal oxide layer on a bottom face of a low-emissivity coating under argon/oxygen atmosphere (argon 20 vol % and oxygen 80 vol %). A first dielectric layer was formed by depositing a 10 nm thick silicon aluminum nitride layer on a top face of the metal oxide layer under argon/nitrogen atmosphere (argon 80 vol % and nitrogen 20 vol %). Then, a lower barrier layer was formed by depositing 0.5 nm thick NiCr layer under 100% argon atmosphere.

A silicon aluminum nitride layer of 35 nm thickness was deposited on a top face of the lower barrier layer under an atmosphere of argon/nitrogen (argon 80 vol % and nitrogen 20 vol %) to form a second dielectric layer. Next, a first low-emissivity protective layer was formed by depositing a 0.5 nm thick NiCr layer under 100% argon atmosphere.

Next, a low-emissivity layer was formed by depositing an Ag layer with a thickness of 10 nm. Then, a second low-emissivity protective layer was formed on a top face of the low-emissivity layer by depositing a 0.5 nm thick NiCr layer on a top face of the low-emissivity layer under an argon atmosphere.

Then, a 10 nm thick silicon aluminum nitride was deposited under argon/nitrogen atmosphere (argon 80 vol % and nitrogen 20 vol %) to form a third dielectric layer. Then, an upper barrier layer was formed by depositing a 0.5 nm thick NiCr layer under 100% argon atmosphere.

Then, a silicon aluminum nitride layer was deposited on a top face of the upper barrier layer under argon/nitrogen (argon 80 vol % and nitrogen 20 vol %) atmosphere to form a 30 nm thick fourth dielectric layer In this way, a functional building material for a window including a vertical sequential stack of the transparent glass substrate, lowest barrier layer, first dielectric layer, lower barrier layer, second dielectric layer, first low-emissivity protective layer, low-emissivity layer, second low-emissivity protective layer, third dielectric layer, upper barrier layer and fourth dielectric layer in this order was produced.

Comparative Example 1

Except that the lowest barrier layer, the lower barrier layer, and the upper barrier layer in Present Example 1 were not formed, in the same manner as in Present Example 1, a functional building material for a window is manufactured. That is, a vertical sequential stack of the transparent glass substrate, first dielectric layer, second dielectric layer, first low-emissivity protective layer, low-emissivity layer, second low-emissivity protective layer, third dielectric layer and fourth third dielectric layer was produced.

Evaluation

Experimental Example 1: Evaluation of Heat Resistance

The functional building materials for the window as manufactured according to Present Example 1 and Comparative Example 1 as samples were put into a box furnace equipment for laboratory. Then, a temperature inside of the equipment was kept at about 700° C. After holding the samples therein for 5 minutes, the samples was taken out from the furnace. After this heat treatment, a defect level was observed using an optical microscope ×200.

Figure 2A:
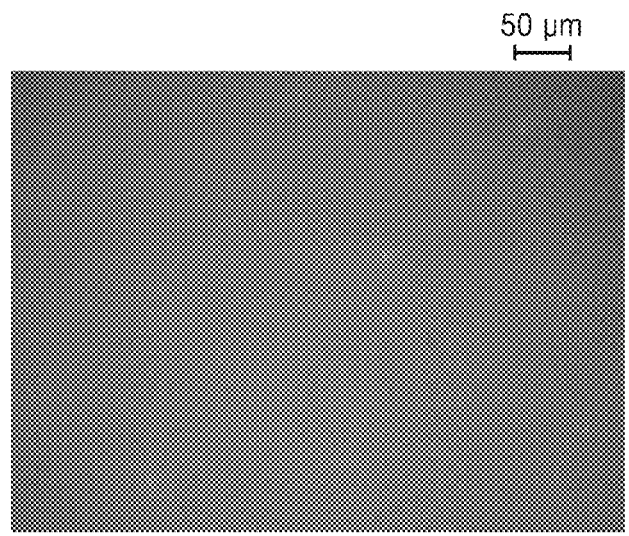
FIG. 2A and FIG. 2B are optical microscope images of functional building materials for windows prepared in accordance with Present Example and Comparative Example under a specific condition for heat resistance evaluation.
Figure 2B:
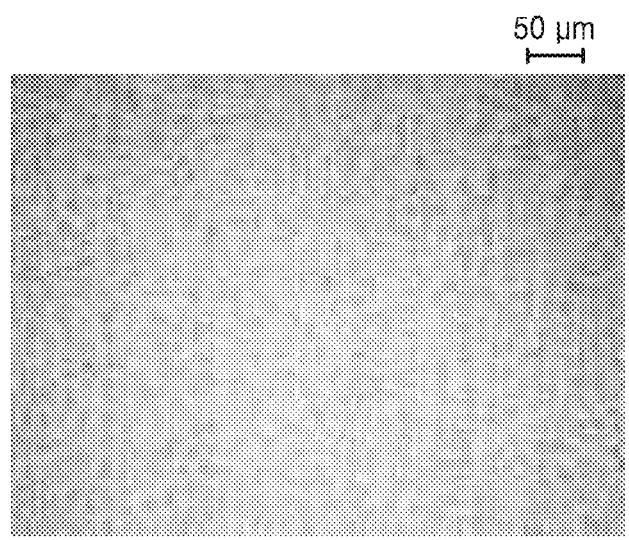

FIG. 2A and FIG. 2B show images of low-emissivity coating films in accordance with Present Example 1 and Comparative Example 1 respectively as observed by optical microscopy after the heat treatment. From those images, the defect level was evaluated.

Table 2 lists the number of defects in FIG. 2A and FIG. 2B.

TABLE 1

| Example | Present Example 1 | Comparative Example 1 |
| --- | --- | --- |
| Number of defects | 0 | Larger than or equal to 200 |

As shown in FIG. 2A and FIG. 2B, it may be seen that in Comparative Example 1, the defect level is high. On the other hand, it is understood that in Present Example 1, the defect level is low due to a decrease in a structural deformation of the low-emissivity coating. It may be confirmed that a thermal property in Present Example 1 is excellent compared with Comparative Example 1.

Experimental Example 2: Evaluation of Moisture Resistance

Figure 3A:
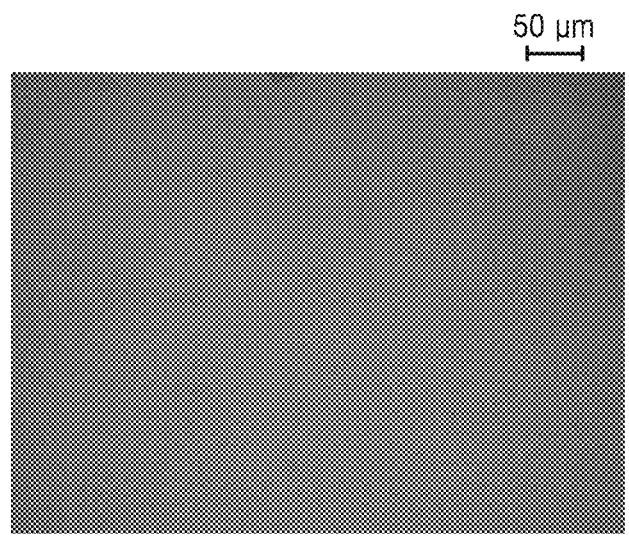
FIG. 3A and FIG. 3B are optical microscope images of functional building materials for windows fabricated in accordance with Present Example and Comparative Example under a specific condition for humidity resistance evaluation.
Figure 3B:
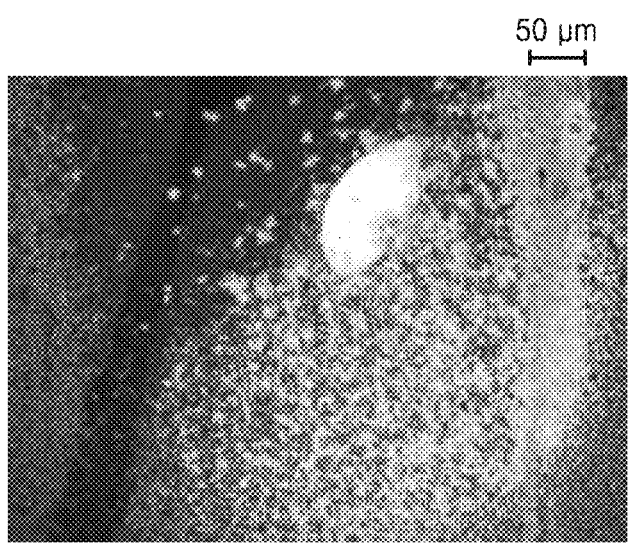

The functional building materials for the window manufactured according to Present Example 1 and Comparative Example 1 were subjected to moisture resistance evaluation (for 7 days) under a condition of 50° C. and 90% RH (humidity) using a constant temperature and constant humidity chamber (LSIS Co., Ltd and EBS-35B). A corrosion level was observed using an optical microscope ×50. FIG. 3A and FIG. 3B are images obtained by photographing a corrosion result with an optical microscope image. FIG. 3A and FIG. 3B are images of Present Example 1 and Comparative Example 1, respectively.

Table 3 shows the number of corrosion points occurring for 3 days since a third day from a test start on the images as observed in FIG. 3A and FIG. 3B.

TABLE 2

| Example | Present Example 1 | Comparative Example 1 |
| --- | --- | --- |
| Number of corrosion points | Smaller than or equal to 5 | Larger than or equal to 100 | it may be seen from the results that Present Example 1 has an improved moisture resistance than Comparative Example 1.

Experimental Example 3: Evaluation of Abrasion Resistance

Figure 4A:
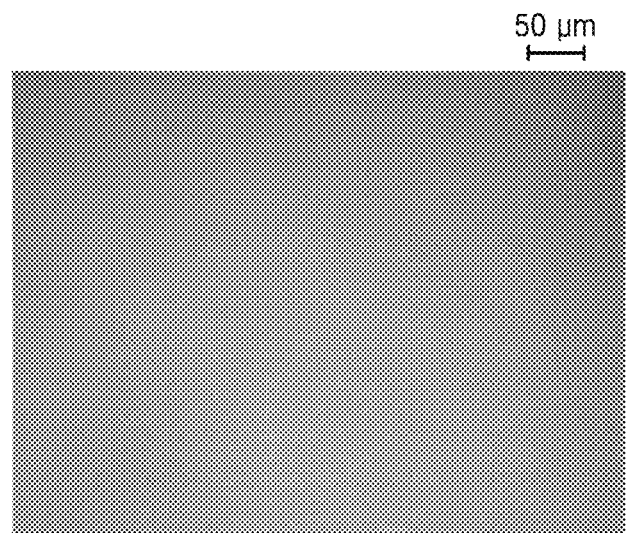
FIG. 4A and FIG. 4B are optical microscope images of functional building materials for windows manufactured in accordance with Present Example and the Comparative Example under a specific condition for wear resistance evaluation.
Figure 4B:
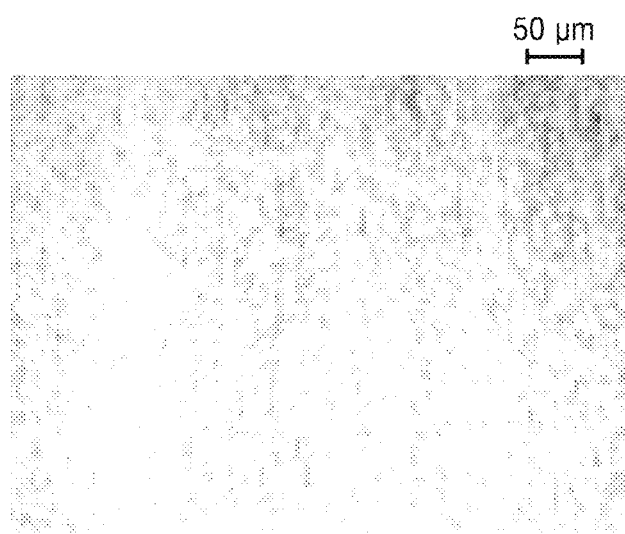

The functional building materials for a window manufactured according to Present Example 1 and Comparative Example 1 as the samples were put into a box furnace at a temperature of about 700° C. Then, after holding the samples therein for 5 minutes, the samples were taken out from the furnace. Then, an abrasion resistance test was carried out using a washing machine (MANNA, MGR-460). Then, whether scratches occurred on surfaces of each low-emissivity coating was visually inspected. Then, the present inventors compared the degrees of occurrence of scratches on the surface of the two low-emissivity coatings to evaluate a mechanical durability thereof. FIG. 4A and FIG. 4B are images obtained by photographing the scratch results with an optical microscope image. FIG. 4A and FIG. 4B are images of Present Example 1 and Comparative Example 1, respectively.

Scratch patterns as observed on the images of FIG. 4A and FIG. 4B are indicated in Table 3.

TABLE 3

| Example | Present Example 1 | Comparative Example 1 |
| --- | --- | --- |
| Scratch pattern | No scratch | Area scratch |

As shown in the Table 3 and FIG. 4A and FIG. 4B, we could confirm that the scratch level was too high and the wear resistance was poor in the Comparative Example 1. On the other hand, in Present Example 1, scratches did not occur due to a decrease in a structural deformation of the low-emissivity coating. Thus, it may be confirmed that in Present Example 1, the abrasion resistance is excellent compared with Comparative Example 1.

Experimental Example 4: Evaluation of Optical Characteristics

The visible light transmittances of the functional building materials prepared according to Present Example 1 and Comparative Example 1 respectively as the samples were measured using a Taber spectrophotometer (haze-gard plus, BYK Gardner) before and after tempering the samples. Further, L*, a*, and b* values in a CIE 1931 standard were measured using a chroma meter (KONICA MINOLTA SENSING, InC., CM-700d) before and after tempering the samples.

A difference ΔT in the light transmittance before and after tempering the samples and a difference in the color index $\Delta E=(\Delta L^2+\Delta a^2+\Delta b^2)^{1/2}$ before and after tempering the samples are listed in a following Table 4.

TABLE 4

| | Example | | | |
|---|---|---|---|---|
| | Present Example 1 | | Comparative Example 1 | |
| | Before tempering | After tempering | Before tempering | After tempering |
| Visible light transmittance | 73.2% | 75.1% ΔT = 1.9% | 67.2% | 72.5% ΔT = 5.3% |
| Chroma T (Transmission) | | ΔE = 1.9 | | ΔE = 2.9 |
| R(coating face reflection) | | ΔE = 2.1 | | ΔE = 4.1 |
| S(glass face reflection) | | ΔE = 1.8 | | ΔE = 3.5 |

As shown in Table 4, we confirmed that in Comparative Example 1, the transmittances before and after the tempering is low and the differences in the transmittance and color index before and after tempering the sample are large. On the other hand, Present Example 1 exhibits high transmittances before and after tempering. In Present Example 1, the differences in the transmittance and color index before and after tempering the sample are small. Thus, it was confirmed that the optical performance in Present Example 1 was superior to that in Comparative Example 1.

It will be apparent to those skilled in the art that various modifications and variations may be made in the present invention without departing from the spirit of the present disclosure. The technical scope of the present disclosure is not limited to the contents described in the embodiments but should be determined by the claims and equivalents thereof.

REFERENCE NUMERALS

10: functional building material for window
100: transparent glass substrate
110: low-emissivity coating
120: low-emissivity layer
130a, 130b: low-emissivity protective layer
140: lower barrier layer
150: upper barrier layer
160: lowest barrier layer
170a, 170b, 170c, 170d: dielectric layer

What is claimed is:

1. A functional building material for a window, the functional building material comprising:
   a transparent glass substrate; and
   a low-emissivity coating formed on the transparent glass substrate, wherein the low-emissivity coating comprises:
   a lowest barrier layer on and in direct contact with the transparent glass substrate;
   a first dielectric layer on and in direct contact with the lowest barrier layer;
   a lower barrier layer on and in direct contact with the first dielectric layer;
   a second dielectric layer on and in direct contact with the lower barrier layer;
   a first low-emissivity protective layer on and in direct contact with the second dielectric layer;
   a low-emissivity layer on and in direct contact with the first low-emissivity protective layer;
   a second low-emissivity protective layer on and in direct contact with the low-emissivity layer;
   a third dielectric layer on and in direct contact with the second low-emissivity protective layer;
   an upper barrier layer on and in direct contact with the third dielectric layer; and
   a fourth dielectric layer on and in direct contact with the upper barrier layer,
   wherein the lowest barrier layer, the first dielectric layer, the lower barrier layer, the second dielectric layer, the first low-emissivity protective layer, the low-emissivity layer, the second low-emissivity protective layer, the third dielectric layer, the upper barrier layer, and the fourth dielectric layer are stacked vertically in this order,
   wherein the lowest barrier layer comprises silicon aluminum oxide,
   wherein each of the lower barrier layer and the upper barrier layer comprises nickel chromium,
   wherein each of the first dielectric layer, the second dielectric layer, the third dielectric layer, and the fourth dielectric layer comprises silicon aluminum nitride,
   wherein each of the lowest barrier layer, the lower barrier layer and the upper barrier layer is single-layered, or multi-layered, and
   wherein each of the first dielectric layer, the second dielectric layer, the third dielectric layer, and the fourth dielectric layer is single-layered.

2. The functional building material of claim 1, wherein the low-emissivity layer includes at least one selected from a group consisting of Ag, Au, Cu, Al, Pt, ion-doped metal oxide, and combinations thereof.

3. The functional building material of claim 1, wherein the low-emissivity layer has an emissivity of 0.01 to 0.3.

4. The functional building material of claim 1, wherein each of the first and second low-emissivity protective layers has an extinction coefficient of 1.5 to 3.5 in a visible light region.

5. The functional building material of claim 1, wherein each of the first low-emissivity protective layer and the second low-emissivity protective layer includes one selected from a group consisting of Ni, Cr, an alloy between Ni and Cr, and combinations thereof.

6. The functional building material of claim 1, wherein the transparent glass substrate is a glass or transparent plastic substrate having a visible light transmittance of 80% to 100%.

* * * * *